(12) United States Patent
White

(10) Patent No.: US 10,103,993 B2
(45) Date of Patent: *Oct. 16, 2018

(54) PHANTOM QUEUE LINK LEVEL LOAD BALANCING SYSTEM, METHOD AND DEVICE

(71) Applicant: Cavium, Inc., San Jose, CA (US)

(72) Inventor: Martin Leslie White, Sunnyvale, CA (US)

(73) Assignee: Cavium, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/862,509

(22) Filed: Jan. 4, 2018

(65) Prior Publication Data

US 2018/0131618 A1    May 10, 2018

Related U.S. Application Data

(63) Continuation of application No. 14/667,568, filed on Mar. 24, 2015, now Pat. No. 9,900,253.

(60) Provisional application No. 62/043,331, filed on Aug. 28, 2014.

(51) Int. Cl.
*H04L 12/803* (2013.01)
*G06F 9/50* (2006.01)
*H04L 12/26* (2006.01)
*H04L 12/801* (2013.01)

(52) U.S. Cl.
CPC .......... *H04L 47/125* (2013.01); *G06F 9/5083* (2013.01); *H04L 43/0882* (2013.01); *H04L 43/16* (2013.01); *G06F 9/505* (2013.01); *H04L 47/11* (2013.01); *H04L 47/122* (2013.01)

(58) Field of Classification Search
CPC ..... H04L 43/00; H04L 43/16; H04L 43/0876; H04L 43/0882; H04L 47/11; H04L 47/122; H04L 47/125; G06F 9/505; G06F 9/5083
USPC ......................................... 370/235, 236, 237
See application file for complete search history.

(56) References Cited

U.S. PATENT DOCUMENTS

| 8,930,505 | B2 * | 1/2015 | Angus ................. H04L 41/0813 709/220 |
| 2014/0119193 | A1 * | 5/2014 | Anand .................... H04L 45/28 370/237 |
| 2015/0271059 | A1 * | 9/2015 | Chunduri ................ H04L 45/12 370/400 |
| 2015/0341273 | A1 * | 11/2015 | Naouri ..................... H04L 47/18 370/231 |

* cited by examiner

*Primary Examiner* — Awet Haile
*Assistant Examiner* — Rownak Islam
(74) *Attorney, Agent, or Firm* — Haverstock & Owens LLP

(57) ABSTRACT

A data processing system includes a phantom queue for each of a plurality of output ports each associated with an output link for outputting data. The phantom queues receive/monitor traffic on the respective ports and/or the associated links such that the congestion or traffic volume on the output ports/links is able to be determined by a congestion mapper coupled with the phantom queues. Based on the determined congestion level on each of the ports/links, the congestion mapper selects one or more non or less congested ports/links as destination of one or more packets. A link selection logic element then processes the packets according to the selected path or multi-path thereby reducing congestion on the system.

30 Claims, 2 Drawing Sheets

PHANTOM QUEUE LINK LEVEL LOAD BALANCING SYSTEM, METHOD AND DEVICE

RELATED APPLICATIONS

This application is a continuation of U.S. application Ser. No. 14/667,568, filed on Mar. 24, 2015, and entitled "PHANTOM QUEUE LINK LEVEL LOAD BALANCING SYSTEM, METHOD AND DEVICE" which claims priority under 35 U.S.C. § 119(e) of the U.S. provisional patent application Ser. No. 62/043,331, filed Aug. 28, 2014, and titled "PHANTOM QUEUE LINK LEVEL LOAD BALANCING SYSTEM, METHOD AND DEVICE," both of which are hereby incorporated by reference.

FIELD OF INVENTION

The present invention relates to load balancing. More particularly, the present invention relates to using phantom queues to balance the load on a system.

BACKGROUND OF THE INVENTION

Load balancing has become increasingly important as data centers look to adopt solutions to minimize congestion and/or packet loss and application jitter. Ethernet switches typically have static balance algorithms that are limited because they do not response to load in the network. Thus, the current switches are unable to dynamically adjust to different loads and are as a result not as efficient as possible.

BRIEF SUMMARY OF THE INVENTION

A data processing system comprises a phantom queue for each of a plurality of output ports each associated with an output link for outputting data. The phantom queues receive/monitor traffic on the respective ports and/or the associated links such that the congestion or traffic volume on the output ports/links is able to be determined by a congestion mapper coupled with the phantom queues. Based on the determined congestion level on each of the ports/links, the congestion mapper selects one or more non or less congested ports/links as destination of one or more packets. A link selection logic element then processes the packets according to the selected path or multi-path thereby reducing congestion on the system. As a result, the system provides the advantage of providing dynamic load balancing for non-TCP traffic by leveraging the phantom queue fill levels.

A first aspect is directed to a dynamic load balancing system on a processing microchip. The system comprises a multipath interface group comprising a plurality of paths for outputting packets from the microchip, wherein each of the paths is coupled to an output port of the microchip, link selection logic that receives input traffic packets and, for each of the packets, selects which one of the output ports the packet is to be output from onto the path coupled to the one of the output ports and a plurality of shapers, wherein each of the shapers is coupled to one of the output ports and limits the outputting of the packets out of the output port such that a rate of data output by the output port is below a data output rate threshold, and further wherein each of the shapers indicate a congestion level of the output port coupled to the shaper that corresponds to a quantity of the packets sent to the output port by the link selection logic during a time period, wherein for each packet the link selection logic determines whether the packet has a transmission control protocol (TCP) format, and if the packet does not have the TCP format, the link selection logic selects the one of the output ports based on the congestion level of each of the output ports. In some embodiments, if the packet does have the TCP format, the link selection logic selects the one of the output ports independent of the congestion level of each of the output ports. In some embodiments, if the packet does have the TCP format, the link selection logic selects the one of the output ports based on a hash of the packet and an equal or weighted cost multipath selection protocol. In some embodiments, if the packet does not have the TCP format, the link selection logic selects the one of the output ports according to a metric except the link selection logic will remove all of the output ports whose congestion level is above a congestion threshold value from a pool of the output ports that are able to be selected according to the metric. In some embodiments, if the packet does not have the TCP format and all of the output ports have a congestion level that is above the congestion threshold value, the link selection logic selects the one of the output ports according to the metric while including all of the output ports in the pool despite the congestion level of all of the output ports. In some embodiments, the metric is one of the group consisting of round robin, random, and smallest congestion level first. In some embodiments, each of the shapers comprise a phantom queue and a credit generator that deposits a credit into the phantom queue at a predefined credit deposit rate, wherein as each packet is output by one of the output ports, the shaper coupled to the one of the output ports removes one or more credits from the phantom queue of the shaper such that a total value of the removed credits is equal to or greater than a size of the packet. In some embodiments, the link selection logic determines the congestion level of each of the output ports based on the number of credits within the phantom queue coupled to the output port. In some embodiments, the system further comprises a plurality of packet queues each coupled with one of the output ports such that the queues receive and queue each of the packets to be output by the output ports. In some embodiments, the link selection logic determines the congestion level of each of the output ports based on a number of the packets within the packet queue associated with the output port. In some embodiments, the system further comprises one of more additional shapers, wherein each of the additional shapers is coupled to one of the output ports and monitors the outputting of the packets out of the output port to determine whether the rate of data output by the output port is above an additional data output rate threshold, and further wherein each of the additional shapers indicate an additional congestion level of the output port coupled to the additional shaper that corresponds to the quantity of the packets sent to the output port by the link selection logic during the time period.

A second aspect is directed to a link selection logic element stored on a non-transitory computer-readable medium of a processing microchip having a plurality of shapers and a multipath interface group including a plurality of paths for outputting packets from the microchip, wherein each of the paths is coupled to an output port of the microchip and each of the shapers is coupled to one of the output ports and monitors the outputting of the packets out of the output port to determine whether a rate of data output by the output port is above a data output rate threshold, the link selection logic element configured to receive a plurality of traffic packets input by the microchip, for each of the traffic packets, determine whether the packet has a transmission control protocol (TCP) format and for each of the traffic packets, select which one of the output ports the packet is to be output from onto the path coupled to the one of the output ports, wherein each of the shapers indicate a congestion level of the output port coupled to the shaper that corresponds to a quantity of the packets sent to the output port by the link selection logic during a time period, and further wherein if the packet does not have the TCP format, the link selection logic selects the one of the output ports based on the congestion level of each of the output ports. In some embodiments, if the packet does have the TCP format, the link selection logic selects the one of the output ports independent of the congestion level of each of the output ports. In some embodiments, if the packet does have the TCP format, the link selection logic selects the one of the output ports based on a hash of the packet and an equal or weighted cost multipath selection protocol. In some embodiments, if the packet does not have the TCP format, the link selection logic selects the one of the output ports according to a metric except the link selection logic will remove all of the output ports whose congestion level is above a congestion threshold value from a pool of the output ports that are able to be selected according to the metric. In some embodiments, if the packet does not have the TCP format and all of the output ports have a congestion level that is above the congestion threshold value, the link selection logic selects the one of the output ports according to the metric while including all of the output ports in the pool despite the congestion level of all of the output ports. In some embodiments, the metric is one of the group consisting of round robin, random, and smallest congestion level first. In some embodiments, each of the shapers comprise a phantom queue and a credit generator that deposits a credit into the phantom queue at a predefined credit deposit rate, wherein as each packet is output by one of the output ports, the shaper coupled to the one of the output ports removes one or more credits from the phantom queue of the shaper such that a total value of the removed credits is equal to or greater than a size of the packet. In some embodiments, the link selection logic determines the congestion level of each of the output ports based on the number of credits within the phantom queue coupled to the output port. In some embodiments, the microchip has a plurality of packet queues each coupled with one of the output ports such that the queues receive and queue each of the packets to be output by the output ports. In some embodiments, the link selection logic determines the congestion level of each of the output ports based on a number of the packets within the packet queue associated with the output port. In some embodiments, the microchip further comprises one of more additional shapers such that each of the additional shapers is coupled to one of the output ports, wherein each of the additional shapers indicate an additional congestion level of the output port coupled to the additional shaper that corresponds to the quantity of the packets sent to the output port by the link selection logic during the time period, and further wherein if the packet does not have the TCP format, the link selection logic selects the one of the output ports based on the congestion level and the additional congestion levels of each of the output ports.

A third aspect is directed to a method of dynamic load balancing within a dynamic load balancing system. The method comprises receiving a plurality of traffic packets with link selection logic on a processing microchip having a plurality of shapers and a multipath interface group including a plurality of paths for outputting packets from the microchip, wherein each of the paths is coupled to an output port of the microchip and each of the shapers is coupled to one of the output ports and monitors the outputting of the packets out of the output port to determine whether a rate of data output by the output port is above a data output rate threshold, for each of the traffic packets, determining whether the packet has a transmission control protocol (TCP) format with the link selection logic and for each of the traffic packets, selecting which one of the output ports the packet is to be output from onto the path coupled to the one of the output ports with the link selection logic, wherein each of the shapers indicate a congestion level of the output port coupled to the shaper that corresponds to a quantity of the packets sent to the output port by the link selection logic during a time period, and further wherein if the packet does not have the TCP format, the link selection logic selects the one of the output ports based on the congestion level of each of the output ports. In some embodiments, the method further comprises, if the packet does have the TCP format, selecting the one of the output ports independent of the congestion level of each of the output ports with the link selection logic. In some embodiments, the method further comprises, if the packet does have the TCP format, selecting the one of the output ports based on a hash of the packet and an equal or weighted cost multipath selection protocol with the link selection logic. In some embodiments, the method further comprises, if the packet does not have the TCP format, selecting the one of the output ports according to a metric with the link selection logic wherein the link selection logic removes all of the output ports whose congestion level is above a congestion threshold value from a pool of the output ports that are able to be selected according to the metric. In some embodiments, the method further comprises, if the packet does not have the TCP format and all of the output ports have a congestion level that is above the congestion threshold value, selecting the one of the output ports according to the metric with the link selection logic while including all of the output ports in the pool despite the congestion level of all of the output ports. In some embodiments, the metric is one of the group consisting of round robin, random, and smallest congestion level first. In some embodiments, each of the shapers comprise a phantom queue and a credit generator that deposits a credit into the phantom queue at a predefined credit deposit rate, further comprising as each packet is output by one of the output ports, removing, with the shaper coupled to the one of the output ports, one or more credits from the phantom queue of the shaper such that a total value of the removed credits is equal to or greater than a size of the packet. In some embodiments, the method further comprises determining the congestion level of each of the output ports with the link selection logic based on the number of credits within the phantom queue coupled to the output port. In some embodiments, the processing microchip further comprises a plurality of packet queues each coupled with one of the output ports such that the queues receive and queue each of the packets to be output by the output ports. In some embodiments, the method further comprises determining the congestion level of each of the output ports with the link selection logic based on a number of the packets within the packet queue associated with the output port. In some embodiments, the processing microchip has one or more additional shapers such that each of the additional shapers is coupled to one of the output ports and monitors the outputting of the packets out of the output port to determine whether the rate of data output by the output port is below an additional data output rate threshold, and further wherein each of the additional shapers indicate an additional congestion level of the output port coupled to the additional shaper that corresponds to the quantity of the packets sent to the output port by the link selection logic during the time period, and further wherein if the packet does not have the TCP format, the selecting of the one of the output ports is based on the congestion level and the additional congestion levels of each of the output ports.

DETAILED DESCRIPTION OF THE INVENTION

Figure 1:
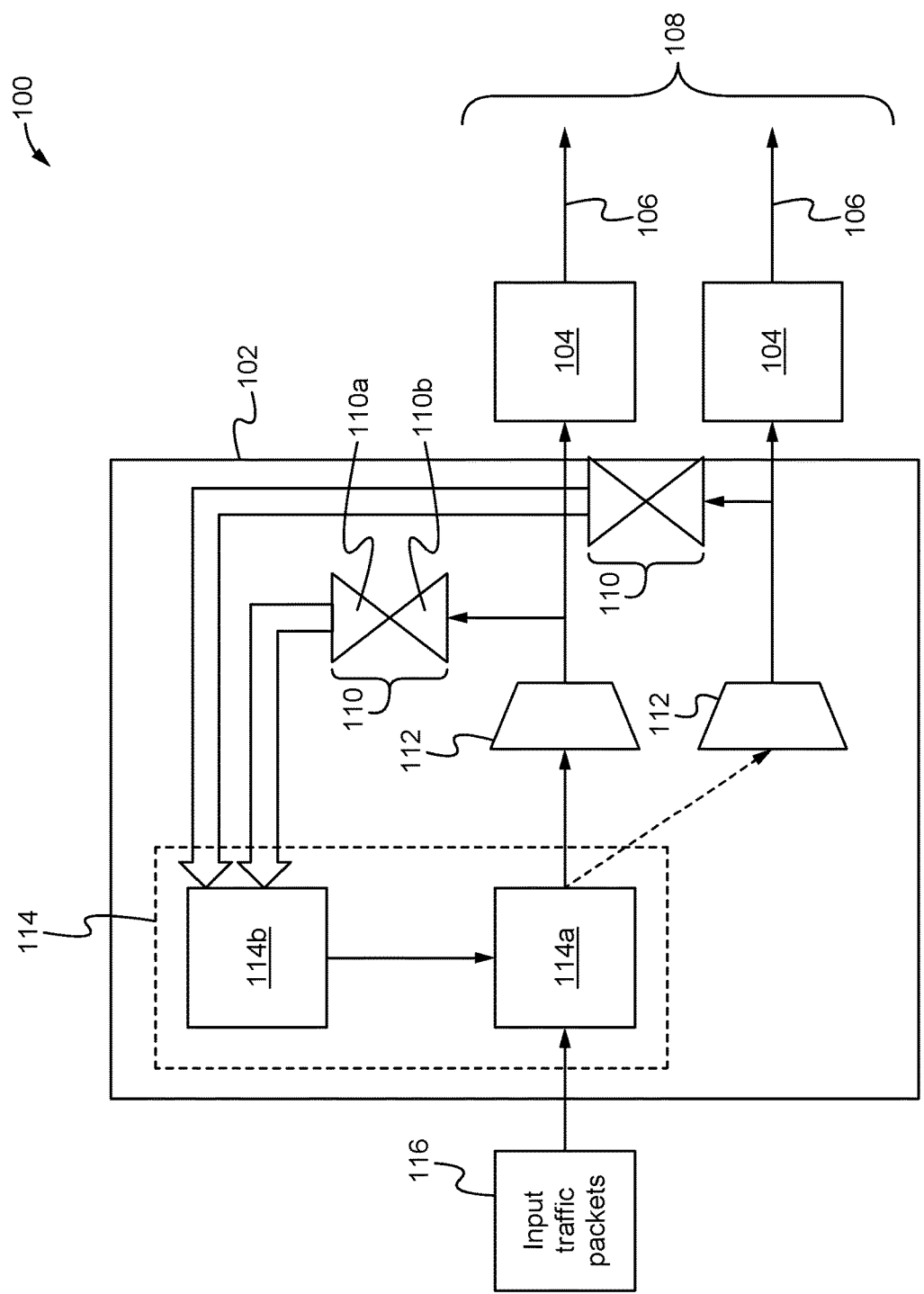
FIG. 1 illustrates a dynamic load balancing system 100 according to some embodiments.

In the following description, numerous details are set forth for purposes of explanation. However, one of ordinary skill in the art will realize that the invention can be practiced without the use of these specific details. Thus, the present invention is not intended to be limited to the embodiments shown but is to be accorded the widest scope consistent with the principles and features described herein.

Embodiments are directed to a data processing system that comprises a phantom queue for each of a plurality of output ports each associated with an output link for outputting data. The phantom queues receive/monitor traffic on the respective ports and/or the associated links such that the congestion or traffic volume on the output ports/links is able to be determined by a congestion mapper coupled with the phantom queues. Based on the determined congestion level on each of the ports/links, the congestion mapper selects one or more non or less congested ports/links as destination of one or more packets. A link selection logic element then processes the packets according to the selected path or multi-path thereby reducing congestion on the system. For example, when a current port/link is determined to be congested, packets are able to be re-routed to one or more of the other links/ports until the current port/link is no longer congested.

In some embodiments, the non-congested ports are selected by masking links to congested ports. In some embodiments, the non-congested ports are determined based on their congestion level value being below a congestion threshold value and the congested ports are determined based on their congestion level being above the congestion threshold value or a different threshold value. In some embodiments, a link/port is determined to be congested if a bucket of the associated phantom queue is empty and/or out of credits for outputting the traffic packets. Alternatively, or in addition, a link/port is determined to be congested based on the queue fill level for the port/link. In some embodiments, TCP traffic is not enabled for the dynamic load balancing of the system such that the traffic is able to ignore congestion levels and thus is not directed to different ports/links by the congestion mapper regardless of the congestion state. In some embodiments, non-TCP traffic is enabled for the load balancing of the system such that it is able to be routed to different ports/links based on the congestion levels by the congestion mapper. Alternatively, both the TCP and the non-TCP traffic is enabled for the load balancing of the system such that it is able to be routed to different ports/links based on the congestion levels by the congestion mapper. In some embodiments, if selection of one of a plurality of non-congested ports is required, the ports/links are able to be selected randomly, in a round robin order, based on the level of congestion (e.g. which has the least current congestion), and/or according to other types of selection priority protocols. In some embodiments, one or more of the phantom queues are able to be replaced and/or supplemented with a traffic shaper. As a result, the system provides the advantage of considering phantom queue indications of congestion levels to dynamically balancing output port packet loads for non-TCP traffic while disregarding phantom queue indications of congestion levels when distributing TCP traffic (e.g. statically balancing output port packet loads for TCP traffic).

FIG. 1 illustrates a dynamic load balancing system 100 according to some embodiments. As shown in FIG. 1, the dynamic load balancing system 100 is able to be located within and/or stored on one or more processing microchips 102 (e.g. one or more software-defined network microchips, datacenter switch, ethernet switch). Alternatively, the system 100 is able to be located within and/or stored on one or more components of a processing circuit. The dynamic load balancing system 100 comprises a plurality of output ports 104, output paths 106, shapers 110, packet queues 112 and link selection logic 114. Although as shown in FIG. 1, the system 100 comprises two output ports 104, output paths 106, shapers 110 and packet queues 112, more output ports 104, output paths 106, shapers 110 and/or packet queues 112 are contemplated. Further, the system 100 is able to comprise more or less components. For example, in some embodiments the packet queues 112 are able to be omitted. Additionally, in some embodiments one or more of the output ports 104 are able to each have a plurality of shapers 110 and/or packet queues 112 operably coupled therewith.

The plurality of output ports 104 are each associated with one of the output path 106, which together form a multipath interface 108. Thus, packets that exit the chip 102 via one of the output ports 104 will travel on the output path 106 associated with the output port 104. In some embodiments, one or more of the output ports 104 are physical ports of the microchip 102. Alternatively, one or more of the output ports 104 are able to be virtual ports of the microchip 102. Each one of the shapers 110 is operably coupled a different one of the packet queues 112 and/or a different one of the output ports 104 such that each link or path 106 is associated with a set of one queue 112, one shaper 110 and one port 104. Alternatively, as described above, a group of a plurality of shapers 110 is able to be operable coupled to each of the packet queues 112 and/or the output ports 104 such that each link or path 106 is associated with a set of one queue 112, a group of shapers 110 and one port 104. As a result, for each of the output ports 104, the packet queue 112 coupled to that port 104 is able to receive and buffer packets that are to be sent to the port 104 until the port 104 is ready to output them. For example, the queue 112 is able to receive packets as routed by the link selection logic 114 and buffer the packets according to a first in first out (FIFO) or other buffering system until they are ready to be received by the corresponding output port 104.

Also for each of the output ports 104, the shaper 110 coupled to that port 104 is able to shape or control the packet rate (e.g. number of packets/time) of the packet traffic traveling out of the output port 104. In particular, the shaper 110 is able to comprise a credit generator 110*a* and a phantom queue 110*b*, wherein the credit generator 110*a* fills the phantom queue 110*b* with credits at a predetermined credit rate and the shaper 110 must remove one of the credits each time the shaper 110 permits a number of packets having a size equal to or less than a value of the credit or credits to be output through the corresponding output port 104. For example, if each credit is worth 256 bytes, the shaper 110 must remove one credit before permitting one or more packets whose size together equal the 256 bytes (i.e. the value of the credit). Correspondingly, if each credit is worth 256 bytes and the packet to be transmitted has a size of 300 bytes, the shaper 110 must wait for at least two credits to accumulate within the queue 110b before permitting the packet to be output and removing two of the at least two credits. Consequently, the shaper 110 is able to limit the maximum output rate of the packets out of the output port 104 because if there are no credits remaining in the phantom queue 110b (because they all have previously been removed and the next credit has yet to be deposited by the credit generator 110a) the shaper 110 will prevent any further packets from being output until a new credit is available. On the other hand, if there are less packets being selected for output via the port 104 (and therefore input by the packet queue 112) than the value of the number of credits being deposited, the phantom queue 110b is able to fill up with extra credits (that cannot be used because there are no packets to output) until the phantom queue 110b is completely full. In this manner, the fill level of each of the phantom queues 110b is able to indicate a congestion level of the associated ports 104, wherein the fuller the phantom queue 110b the lower the congestion level of the port 104 and vice versa.

In some embodiments, the shapers 110 are able to be passive in that they do not enforce restricting traffic or packet transmission to the shaper rate, rather they only passively monitor the rate of the packet traffic to detect when a congestion level is reached and then signal that information to the selection logic. Further, in some embodiments wherein one or more groups of shapers 110 are each coupled to different single output ports 104, each shaper 110 of the groups is able to have a credit generator 110a that generates credits at a different rate and/or of a different size than the other credit generators 110a of the other shapers 110 in the group. As a result, the different shapers 110 will each have different phantom queue fill levels (i.e. indicate different congestion levels) based on the rates that credits are produced by the separate credit generators 110a in comparison with the rate that packets are being output via the associate output port 104. Thus, in such embodiments, multi-level congestion indications (e.g. one for each shaper 110 in the group) are able to be provided to the link selection logic 114 for each port 104 coupled with one of the groups of shapers 110.

The link selection logic 114 is coupled with or is provided access to input traffic packets 116 and each path 106 including the associated port 104, shaper 110 and packet queue 112. As a result, the selection logic 114 is able to input or access traffic in the form of packets that enter the system 100 and phantom queue vectors from the shapers 110 indicating the current number of credits (e.g. a congestion level) within each of the phantom queues 110b, and further able to determine which of the paths 106 and/or ports 104 each of the packets are output from by the system 100. In particular, upon determining whether an input packet is a TCP or non-TCP format packet, the link selection logic 114 is able to use a TCP selection metric to select one of the ports 104 from which to output the input packet determined to be a TCP or TCP format packet. For example, the TCP metric is able to be a weighted or equal cost multipath metric that selects a port 104 based on a hash or other representation of the TCP packets in order to attempt to maintain the order of the sequence of the TCP packets. Alternatively, the TCP metric is able to be other types of selection metrics that prioritize maintaining the sequence of the TCP packets.

In contrast, if the input packet is determined to be a non-TCP or TCP format packet, the link selection logic 114 is able to use a non-TCP selection metric and the phantom queue vectors to select one of the ports 104 from which to output the input packet. Specifically, the link selection logic 114 is able to input or review the latest phantom queue vector and remove any of the ports 104 whose vector value (or congestion level or phantom queue 110b fill level) indicates a level of congestion that exceeds a predetermined congestion threshold from the pool of ports 104 that are able to be selected by the non-TCP selection metric. Then, based on this remaining pool of the ports 104, the link selection logic 114 is able to select the one of the ports 104 from which to output the input packet based on the non-TCP selection metric. Alternatively, the TCP selection metric is able to be used based on the remaining pool of ports 104. As a result, heavily congested ports 104 are prohibited from selection by the selection logic 114 until their congestion level falls back below the threshold thereby dynamically balancing the traffic load on the ports 104 for the non-TCP traffic.

In some embodiments, the non-TCP selection metric is able to be the port 104 whose vector value indicates the lowest level of congestion. In particular, in the case wherein a group of shapers 110 produce a plurality of congestion levels for each of the ports 104, the port 104 with the lowest congestion level is able to be determined based on which port 104 has the least number of shapers whose congestion level is above the threshold. In other words, in such embodiments the number of shapers 110 of each of the groups of shapers 110 that indicate a congestion level above the threshold is able to be used by the selection logic 114 to determine which port 104 to select and/or which ports 104 to remove from the pool of selectable ports 104. Alternatively, the non-TCP selection metric is able to be a random, round robin or other schedule of selecting one of the pool of ports 104.

In the case where based on the vector values the congestion levels of all of the ports 104 of the multipath interface 108 exceed the congestion threshold, the link selection logic 114 is able to add all of the ports 104 back into the pool (despite their congestion levels) and based on this full pool of the ports 104 select the one of the ports 104 from which to output the input packet based on the non-TCP selection metric. Alternatively, the TCP selection metric is able to be used in such a case based on the full pool of ports 104. Thus, in any case the system provides the advantage of considering phantom queue 110b indications of congestion levels to dynamically balancing output port 104 packet loads for non-TCP traffic while disregarding phantom queue 110b indications of congestion levels when distributing TCP traffic (e.g. statically balancing output port 104 packet loads for TCP traffic). In some embodiments, each shaper 110 is subject to the same credit generation rate (e.g. congestion threshold). Alternatively, one or more of the shapers 110 are able to be subject to different credit generation rates (e.g. congestion thresholds). In some embodiments, as shown in FIG. 1, the link selection logic 114 is able to comprise a first component 114b that receives the phantom queue vectors and performs the link selection for the non-TCP traffic and a second component 114b that performs the link selection for the TCP traffic. Alternatively, the first and second components 114a, 114b are able to be combined as a single component 114. In some embodiments, the determination whether the traffic is TCP or non-TCP is able to be omitted and instead all traffic is able to be subject to the non-TCP selection metric as if it were all non-TCP traffic as described above.

In some embodiments, other factors are able to be considered for non-TCP traffic before removing ports 104 from the pool of ports 104 from which a packet is output. For example, in addition to or in lieu of whether the congestion threshold is exceeded based on the phantom queue, the link selection logic is able to determine and consider the current level of fullness of packets of the associated packet queue 112. In particular, the packet queue fullness level is able to be compared to the packet queue fullness threshold wherein a port 104 is removed from the pool only when both the packet queue fullness and the phantom queue thresholds have been exceeded, when at least one of the packet queue fullness and the phantom queue thresholds have been exceeded, or solely based on when the packet queue fullness threshold has been exceeded. Alternatively or in addition, other factors such as quantized congestion notification methods are able to be used to determine when to remove ports 104 from the pool of ports.

Figure 2:
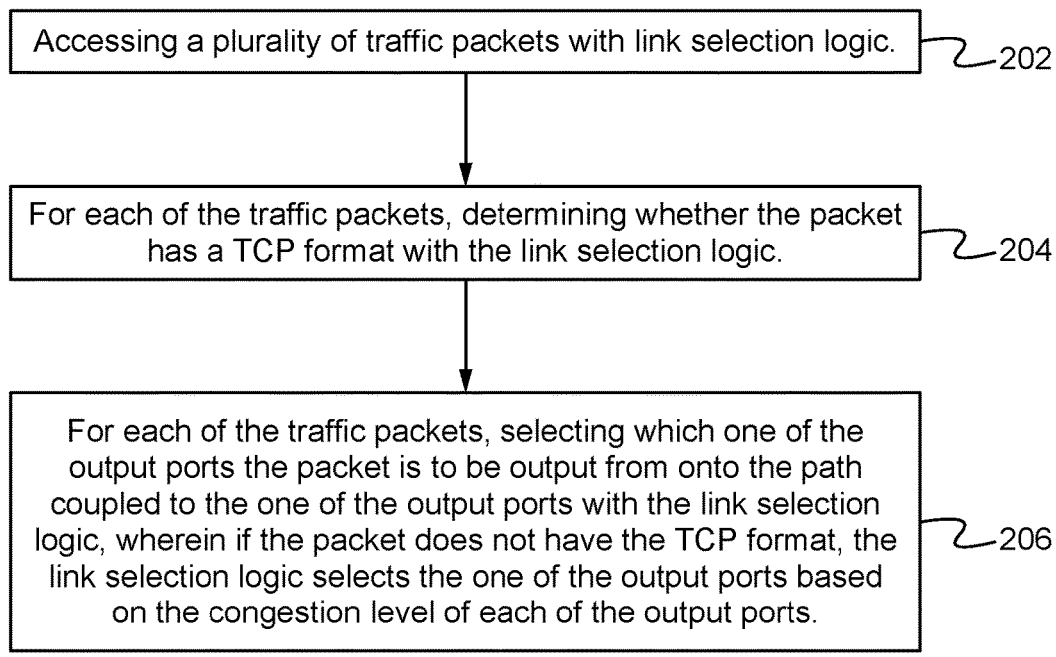
FIG. 2 illustrates a method of dynamic load balancing within a dynamic load balancing system according to some embodiments.

FIG. 2 illustrates a method of dynamic load balancing within a dynamic load balancing system 100 according to some embodiments. As shown in FIG. 2, the link selection logic 114 accesses or receives a plurality of traffic packets at the step 202. Then, for each of the traffic packets, the selection logic 114 determines whether the packet has a TCP format at the step 204. Accordingly, for each of the traffic packets, the link selection logic 114 selects which one of the output ports 104 the packet is to be output from onto the path 106 coupled to the one of the output ports 104, wherein if the packet does not have the TCP format, the link selection logic 114 selects the one of the output ports 104 based on the congestion level of each of the output ports 104 at the step 206. Specifically, the link selection logic 114 is able to determine the congestion level of each of the output ports 104 based on the number of credits within the phantom queue 110b coupled to the output port 104. Alternatively or in addition, the link selection logic 114 is able to determine the congestion level of each of the output ports 104 based on a number of the packets within the packet queue 112 associated with the output port 104. As a result, the method is able to provide the advantage of dynamically load balancing the outputting of the non-TCP traffic based on port congestion level. If instead the packet does have the TCP format, the link selection logic 114 is able to select the one of the output ports 104 independent of the congestion level of each of the output ports 104. In other words, unlike non-TCP traffic, the system 100 is able to recognize the preference for keeping TCP traffic in sequence and thus does not apply the dynamic load balancing to its port selection for TCP traffic. As a result, the method further provides the advantage of distinguishing between traffic types and applying different port selection metrics based on the traffic type/format.

If the packet does have the TCP format, the selecting the one of the output ports 104 is able to be based on a hash of the packet and an equal or weighted cost multipath selection protocol. If the packet does not have the TCP format, the selecting the one of the output ports 104 is able to be according to a non-TCP metric, wherein the link selection logic 114 removes all of the output ports 104 whose congestion level is above a congestion threshold value from a pool of the output ports 104 that are able to be selected according to the non-TCP metric. In some embodiments, the non-TCP metric is one of the group consisting of round robin, random, and smallest congestion level first. Alternatively, other metrics are able to be used and/or a combination of round robin, random, and smallest congestion level first wherein the combined metrics are prioritized and implemented according to the priority wherein the next metric is used to break ties of the previous metric. Also, in some embodiments if the packet does not have the TCP format and all of the output ports 104 have a congestion level that is above the congestion threshold value, the link selection logic 114 selects the one of the output ports 104 according to the metric while including all of the output ports 104 in the pool despite the congestion level of all of the output ports 104. Thus, the method provides the advantage of ensuring the packet flow is not halted in the case that all the ports 104 are above the congestion threshold.

Accordingly, the dynamic load balancing system provides the advantage of distinguishing between traffic types and applying different port selection metrics based on the traffic type/format. Further, the system provides the advantage of considering phantom queue indications of congestion levels to dynamically balancing output port packet loads for non-TCP traffic while disregarding phantom queue indications of congestion levels when distributing TCP traffic (e.g. statically balancing output port packet loads for TCP traffic). Moreover, the system provides the advantage of ensuring the packet flow is not halted in the case that all the ports are above the congestion threshold. Therefore, the dynamic load balancing system described herein has numerous advantages.

One of ordinary skill in the art will realize other uses and advantages also exist. While the invention has been described with reference to numerous specific details, one of ordinary skill in the art will recognize that the invention can be embodied in other specific forms without departing from the spirit of the invention. For example, although the system described herein illustrates a single multipath interface 108, a plurality of multipath interfaces 108 are contemplated wherein each packet is assigned to one of the interfaces and is then sent to one of the ports 104 of that interface 108 as described above. As another example, although the different methods described herein describe a particular order of steps, other orders are contemplated as well as the omission of one or more of the steps and/or the addition of one or more new steps. Moreover, although the methods above are described herein separately, one or more of the methods are able to be combined (in whole or part). Thus, one of ordinary skill in the art will understand that the invention is not to be limited by the foregoing illustrative details, but rather is to be defined by the appended claims. Additionally, it should be noted that, unlike policers, shapers 110 do not drop any packets in order to control the output rate of a port 104. Instead, shapers 110 only delay the packets to ensure the maximum output rate is not exceeded.

While the invention has been described with reference to numerous specific details, one of ordinary skill in the art will recognize that the invention can be embodied in other specific forms without departing from the spirit of the invention. Thus, one of ordinary skill in the art will understand that the invention is not to be limited by the foregoing illustrative details, but rather is to be defined by the appended claims.

I claim:
1. A dynamic load balancing system on a microchip, the system comprising:
a plurality of output ports;
link selection logic that receives packets and, for each of the packets, selects which one of the output ports the packet is to be output from; and a plurality of shapers, wherein each of the shapers is coupled to one of the output ports, and further wherein each of the shapers indicate a congestion level of the output port coupled to the shaper;

wherein for each of the packets:
if the packet has a transmission control protocol (TCP) format, the link selection logic selects the one of the output ports independent of the congestion level of each of the output ports; and
if the packet does not have the TCP format, the link selection logic selects the one of the output ports based on the congestion level of each of the output ports.

2. The system of claim 1, wherein if the packet does have the TCP format, the link selection logic selects the one of the output ports based on a hash of the input traffic packet and an equal or weighted cost multipath selection protocol.

3. The system of claim 2, wherein if the packet does not have the TCP format, the link selection logic selects the one of the output ports according to a metric except the link selection logic will remove all of the output ports whose congestion level is above a congestion threshold value from a pool of the output ports that are able to be selected according to the metric.

4. The system of claim 3, wherein if the packet does not have the TCP format and all of the output ports have a congestion level that is above the congestion threshold value, the link selection logic selects the one of the output ports according to the metric while including all of the output ports in the pool despite the congestion level of all of the output ports.

5. The system of claim 4, wherein the metric is one of the group consisting of round robin, random, and smallest congestion level first.

6. The system of claim 5, wherein each of the shapers comprise:
a phantom queue; and
a credit generator that deposits a credit into the phantom queue at a predefined credit deposit rate;
wherein as each of the packets is output by one of the output ports, the shaper coupled to the one of the output ports removes one or more credits from the phantom queue of the shaper such that a total value of the removed one or more credits is equal to or greater than a size of the packet.

7. The system of claim 6, wherein the link selection logic determines the congestion level of each of the output ports based on the number of credits within the phantom queue coupled to the output port.

8. The system of claim 7, further comprising a plurality of packet queues each coupled with one of the output ports such that the queues receive and queue each of the packets to be output by the output ports.

9. The system of claim 8, wherein the link selection logic determines the congestion level of each of the output ports based on a number of the packets within a packet queue associated with the output port.

10. The system of claim 9, further comprising one of more additional shapers, wherein each of the additional shapers is coupled to one of the output ports and monitors the outputting of the packets out of the output port to determine whether a rate of data output by the output port is above an additional data output rate threshold, and further wherein each of the additional shapers indicate an additional congestion level of the output port coupled to the additional shaper.

11. A link selection logic element stored on a non-transitory computer-readable medium of a microchip having a plurality of shapers and a plurality of output ports, wherein each of the shapers is coupled to one of the output ports, the link selection logic element configured to:
receive a plurality of packets input by the microchip; and
for each of the packets, select which one of the output ports the packet is to be output from, wherein if the packet has transmission control protocol (TCP) format, selection of the one of the output ports is independent of a congestion level of each of the output ports, and if the packet does not have the TCP format, selection of the one of the output ports is based on the congestion level of each of the output ports;
wherein each of the shapers indicate the congestion level of the output port coupled to the shaper.

12. The link selection logic element of claim 11, wherein if the packet does have the TCP format, the link selection logic element selects the one of the output ports based on a hash of the packet and an equal or weighted cost multipath selection protocol.

13. The link selection logic element of claim 12, wherein if the packet does not have the TCP format, the link selection logic element selects the one of the output ports according to a metric except the link selection logic element will remove all of the output ports whose congestion level is above a congestion threshold value from a pool of the output ports that are able to be selected according to the metric.

14. The link selection logic element of claim 13, wherein if the packet does not have the TCP format and all of the output ports have a congestion level that is above the congestion threshold value, the link selection logic element selects the one of the output ports according to the metric while including all of the output ports in the pool despite the congestion level of all of the output ports.

15. The link selection logic element of claim 14, wherein the metric is one of the group consisting of round robin, random, and smallest congestion level first.

16. The link selection logic element of claim 15, wherein each of the shapers comprise:
a phantom queue; and
a credit generator that deposits a credit into the phantom queue at a predefined credit deposit rate;
wherein as each of the packets is output by one of the output ports, the shaper coupled to the one of the output ports removes one or more credits from the phantom queue of the shaper such that a total value of the removed one or more credits is equal to or greater than a size of the input traffic packet.

17. The link selection logic element of claim 16, wherein the link selection logic element determines the congestion level of each of the output ports based on a number of credits within the phantom queue coupled to the output port.

18. The link selection logic element of claim 17, wherein the microchip has a plurality of packet queues each coupled with one of the output ports such that the queues receive and queue each of the packets to be output by the output ports.

19. The link selection logic element of claim 18, wherein the link selection logic element determines the congestion level of each of the output ports based on a number of the packets within a packet queue associated with the output port.

20. The link selection logic element of claim 19, wherein the microchip further comprises one of more additional shapers such that each of the additional shapers is coupled to one of the output ports, wherein each of the additional shapers indicate an additional congestion level of the output port coupled to the additional shaper, and further wherein if the packet does not have the TCP format, the link selection logic element selects the one of the output ports based on the congestion level and the additional congestion levels of each of the output ports.

21. A method of dynamic load balancing within a dynamic load balancing system, the method comprising:

receiving a plurality of packets with link selection logic on a microchip having a plurality of shapers and plurality of output ports, wherein each of the shapers is coupled to one of the output ports; and for each of the packets, selecting which one of the output ports the packet is to be output from with the link selection logic, wherein if the packet has a transmission control protocol (TCP) format, selection of the one of the output ports is independent of a congestion level of each of the output ports, and if the packet does not have the TCP format, selection of the one of the output ports is based on the congestion level of each of the output ports;

wherein each of the shapers indicate the congestion level of the output port coupled to the shaper.

22. The method of claim 21, further comprising, if the packet does have the TCP format, selecting the one of the output ports based on a hash of the packet and an equal or weighted cost multipath selection protocol with the link selection logic.

23. The method of claim 22, further comprising, if the packet does not have the TCP format, selecting the one of the output ports according to a metric with the link selection logic wherein the link selection logic removes all of the output ports whose congestion level is above a congestion threshold value from a pool of the output ports that are able to be selected according to the metric.

24. The method of claim 23, further comprising, if the packet does not have the TCP format and all of the output ports have a congestion level that is above the congestion threshold value, selecting the one of the output ports according to the metric with the link selection logic while including all of the output ports in the pool despite the congestion level of all of the output ports.

25. The method of claim 24, wherein the metric is one of the group consisting of round robin, random, and smallest congestion level first.

26. The method of claim 21, wherein each of the shapers comprise:

a phantom queue; and
a credit generator that deposits a credit into the phantom queue at a predefined credit deposit rate;

further comprising as each of the packets is output by one of the output ports, removing, with the shaper coupled to the one of the output ports, one or more credits from the phantom queue of the shaper such that a total value of the removed one or more credits is equal to or greater than a size of the packet.

27. The method of claim 26, further comprising determining the congestion level of each of the output ports with the link selection logic based on a number of credits within the phantom queue coupled to the output port.

28. The method of claim 27, wherein the microchip further comprises a plurality of packet queues each coupled with one of the output ports such that the queues receive and queue each of the packets to be output by the output ports.

29. The method of claim 28, further comprising determining the congestion level of each of the output ports with the link selection logic based on a number of the packets within a packet queue associated with the output port.

30. The method of claim 29, wherein the microchip has one or more additional shapers such that each of the additional shapers is coupled to one of the output ports and monitors the outputting of the packets out of the output port to determine whether a rate of data output by the output port is below an additional data output rate threshold, and further wherein each of the additional shapers indicate an additional congestion level of the output port coupled to the additional shaper, and further wherein if the packet does not have the TCP format, the selecting of the one of the output ports is based on the congestion level and the additional congestion levels of each of the output ports.

* * * * *